United States Patent
Ando et al.

(10) Patent No.: US 12,280,836 B2
(45) Date of Patent: Apr. 22, 2025

(54) VEHICLE BODY LOWER STRUCTURE

(71) Applicant: Honda Motor Co., Ltd., Tokyo (JP)

(72) Inventors: Kenichi Ando, Saitama (JP); Kei Ambo, Tokyo (JP); Yuki Nakamura, Tokyo (JP); Yoshiteru Hoshida, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 17/966,885

(22) Filed: Oct. 16, 2022

(65) Prior Publication Data

US 2023/0166801 A1  Jun. 1, 2023

(30) Foreign Application Priority Data

Nov. 30, 2021 (CN) .......................... 202111449132.9

(51) Int. Cl.
  *B62D 35/02* (2006.01)
  *B62D 35/00* (2006.01)
  *B62D 37/02* (2006.01)

(52) U.S. Cl.
  CPC ........... *B62D 35/02* (2013.01); *B62D 35/005* (2013.01); *B62D 37/02* (2013.01)

(58) Field of Classification Search
  CPC .... B62D 35/02; B62D 35/001; B62D 35/007; B62D 35/008; B62D 35/005; B62D 35/04; B62D 37/02
  USPC .......................................... 296/180.1–180.3
  See application file for complete search history.

(56) References Cited

U.S. PATENT DOCUMENTS

| | | | |
|---|---|---|---|
| 4,159,140 A * | 6/1979 | Chabot | B62D 35/005 296/180.5 |
| 7,775,582 B2 * | 8/2010 | Browne | B62D 35/005 296/180.1 |
| 8,702,152 B1 | 4/2014 | Platto et al. | |
| 9,834,077 B2 | 12/2017 | Konishi et al. | |
| 10,953,934 B2 | 3/2021 | Herlem | |

FOREIGN PATENT DOCUMENTS

| | | | |
|---|---|---|---|
| CN | 103921852 | 7/2014 | |
| CN | 106660438 | 5/2017 | |
| CN | 110431065 | 11/2019 | |
| FR | 2540813 A * | 8/1984 | B62D 35/005 |

OTHER PUBLICATIONS

FR2540813 Text (Year: 1984).*
"Office Action of China Counterpart Application", issued on Feb. 6, 2025, with English translation thereof, p. 1-p. 13.

* cited by examiner

*Primary Examiner* — Dennis H Pedder
(74) *Attorney, Agent, or Firm* — JCIPRNET

(57) ABSTRACT

The disclosure provides a vehicle body lower structure. The vehicle body lower structure includes: a deflector, disposed on a vehicle body and movable between a stowed position covering a lower part of the vehicle body and a deployed position protruding downward; and a shaft member, extending in a vehicle left-right direction and rotatably connecting a front end of the deflector to the vehicle body. The deflector is maintained in the deployed position protruding downward by its own weight, and receiving an impact load from below, the deflector moves from the deployed position to the stowed position.

3 Claims, 14 Drawing Sheets

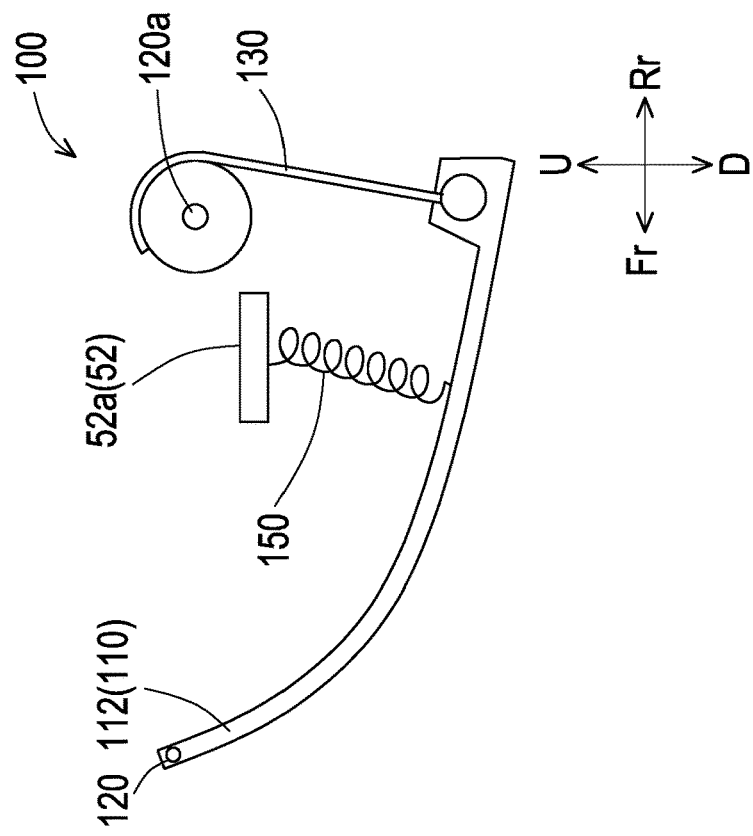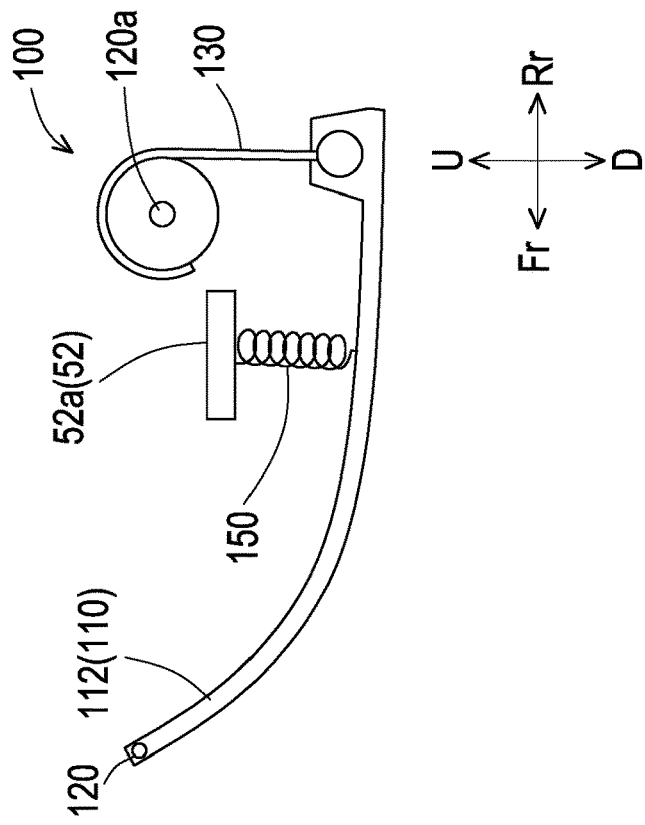
FIG. 6B
FIG. 6A

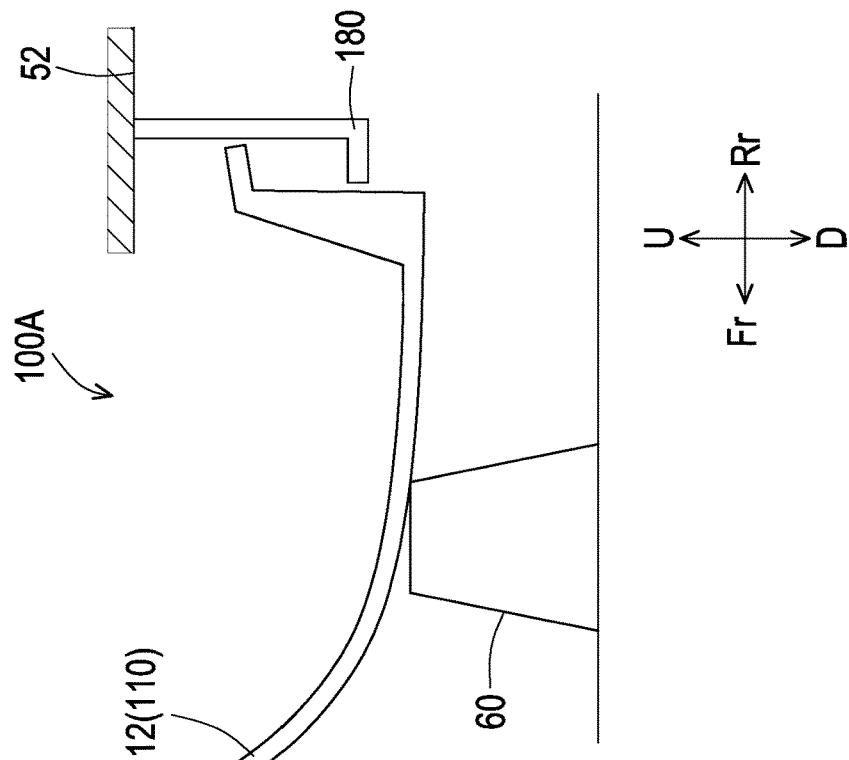
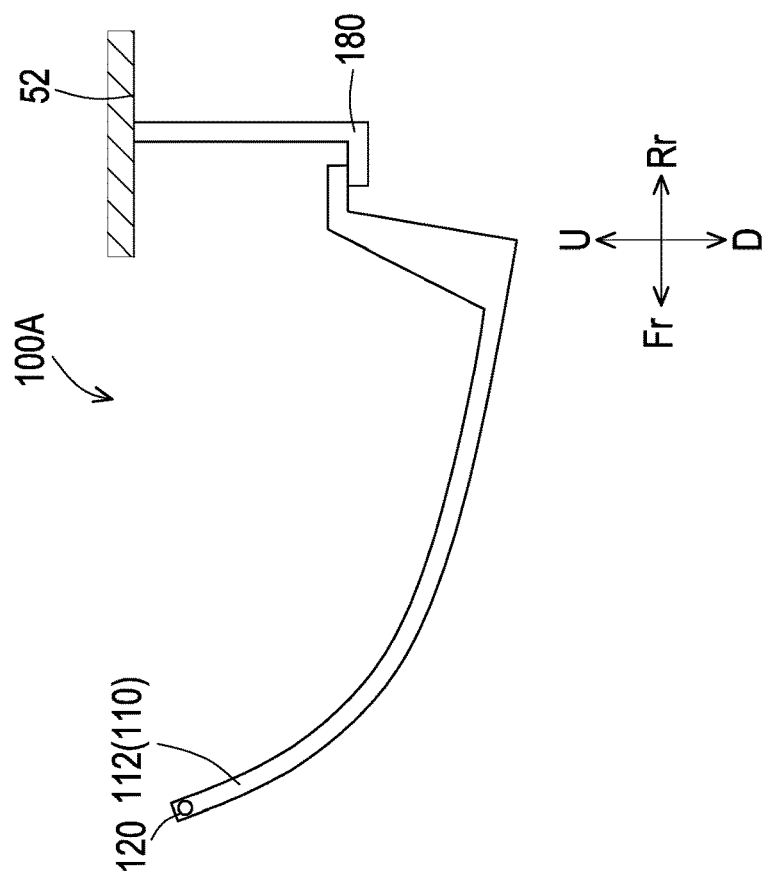
FIG. 11A
FIG. 11B

VEHICLE BODY LOWER STRUCTURE

CROSS-REFERENCE TO RELATED APPLICATION

This application claims the priority benefits of Chinese application no. 202111449132.9, filed on Nov. 30, 2021. The entirety of the above-mentioned patent application is hereby incorporated by reference herein and made a part of this specification.

BACKGROUND

Technical Field

The disclosure relates to a vehicle body structure, in particular to a vehicle body lower structure.

Related Art

In the prior art, a vehicle body lower structure composed of a plurality of plates or frames is mounted on a vehicle body. The shape of the vehicle is designed to improve the energy efficiency of the vehicle and reduce the impact of the vehicle on the natural environment damage. In order to further improve the aerodynamic performance, it is necessary to create an aerodynamically favorable flow through pressure distribution control in addition to the fairing effects of the existing under cover. For example, Patent Literature 1 (U.S. Pat. No. 10,953,934) discloses a vehicle body lower structure, which includes a deflector movable between a stowed position covering a lower part of the vehicle body and a deployed position protruding downward, thereby further improving the aerodynamic performance of a center lower part of the vehicle. However, while improving a plate body and the like of the vehicle body lower structure, it is also necessary to consider the layout of the components previously disposed in the lower part of the vehicle body. Therefore, it is necessary to develop mass-produced devices that meet aerodynamic performance and layout requirements.

The disclosure provides a vehicle body lower structure, which can improve aerodynamic performance, and can suppress an impact on a deflector when an obstacle is encountered.

SUMMARY

The disclosure provides a vehicle body lower structure, including: a deflector, disposed on a vehicle body and movable between a stowed position covering a lower part of the vehicle body and a deployed position protruding downward; and a shaft member, extending in a vehicle left-right direction and rotatably connecting a front end of the deflector to the vehicle body, in which the deflector is maintained in the deployed position protruding downward by its own weight, and when receiving an impact load from below, the deflector moves from the deployed position to the stowed position.

In an embodiment of the disclosure, the vehicle body lower structure further includes: an elastic member, disposed between the vehicle body and the deflector to apply force on the deflector. The deflector is maintained in the deployed position protruding downward further by the force applied by the elastic member, and when receiving an impact load from below, the elastic member is compressed, allowing the deflector to move from the deployed position to the stowed position.

In an embodiment of the disclosure, the deflector is maintained in the deployed position via a buckle member disposed on the vehicle body.

In an embodiment of the disclosure, the vehicle body lower structure further includes: a hook member, disposed on an upper surface of the deflector. When the deflector is in the stowed position, the hook member is separated from a snap portion of the vehicle body, and when the deflector is in the deployed position, the hook member is snapped onto the snap portion of the vehicle body.

BRIEF DESCRIPTION OF THE DRAWINGS

In order to make the features and advantages of the disclosure more obvious and easy to understand, the following embodiments are given and described in detail with the accompanying drawings as follows.

FIG. 6A to FIG. 6D are schematic side views of a belt member shown in FIG. 5 when the deflector is in the stowed position, the deployed position, encounters an obstacle, and after passing an obstacle.

FIG. 11A and FIG. 11B are schematic side views of a deflector of the vehicle body lower structure shown in FIG. 10 at a stowed position and a deployed position.

DESCRIPTION OF THE EMBODIMENTS

Based on the above, in the vehicle body lower structure of the disclosure, a deflector is disposed on a vehicle body, and is movable between a stowed position covering a lower part of the vehicle body and a deployed position protruding downward, and the shaft member extends in a vehicle left-right direction and rotatably connecting front ends of the deflector to the vehicle body. The deflector is maintained in the deployed position protruding downward by its own weight, and when receiving an impact load from below, the deflector moves from the deployed position to the stowed position. In this manner, the deflector is maintained in the deployed position in most cases, and when the deflector encounters an obstacle and receives an impact load from below, there is no member above the deflector that blocks the deflector from moving from the deployed position to the stowed position, so the deflector may be smoothly moved from the deployed position to the stowed position without being damaged. Accordingly, the vehicle body lower structure of the disclosure can improve the aerodynamic performance, and can suppress the impact on the deflector when an obstacle is encountered.

Figure 1:
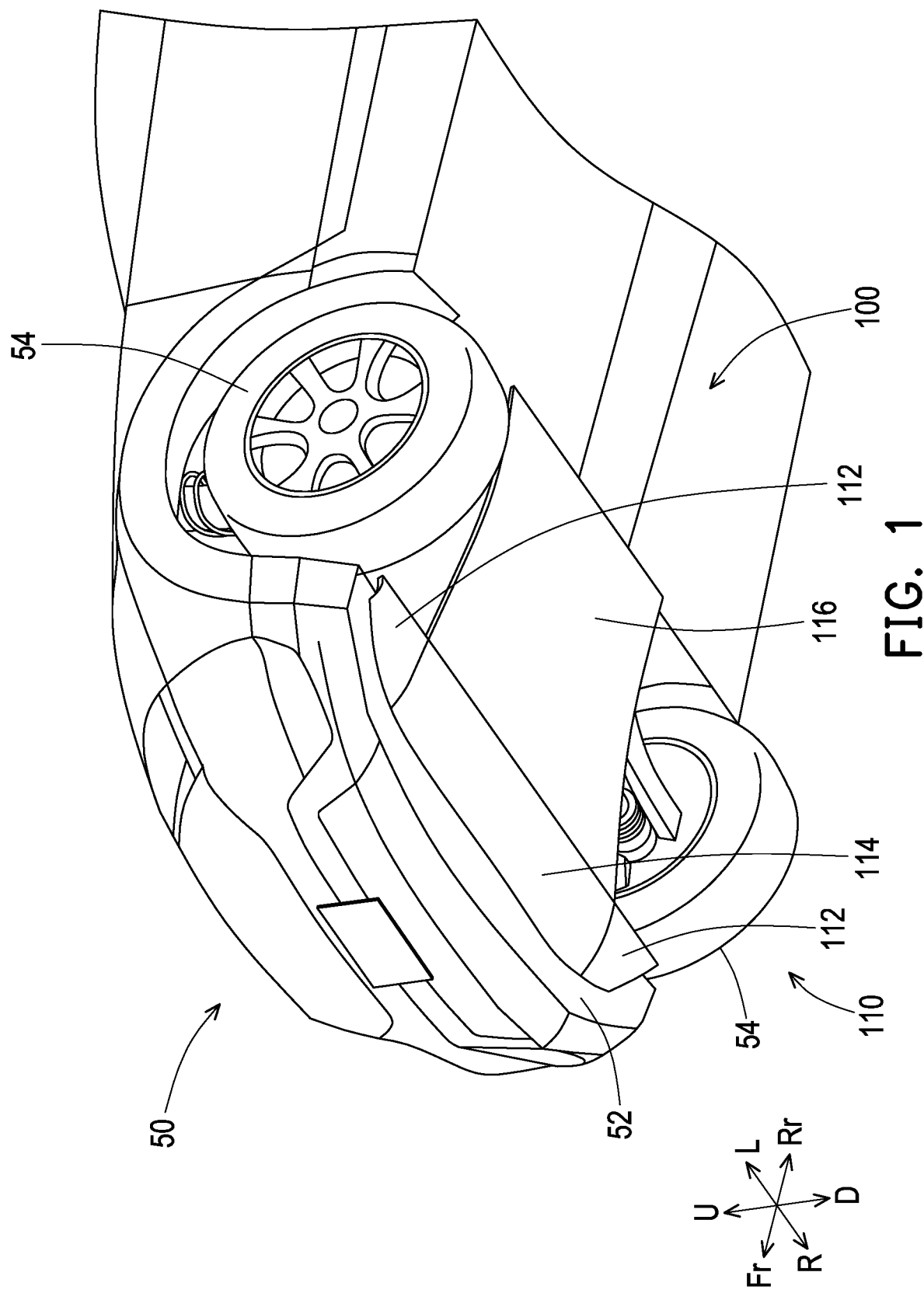
FIG. 1 is a schematic perspective view of a vehicle body lower structure applied to a vehicle body according to an embodiment of the disclosure.
Figure 2:
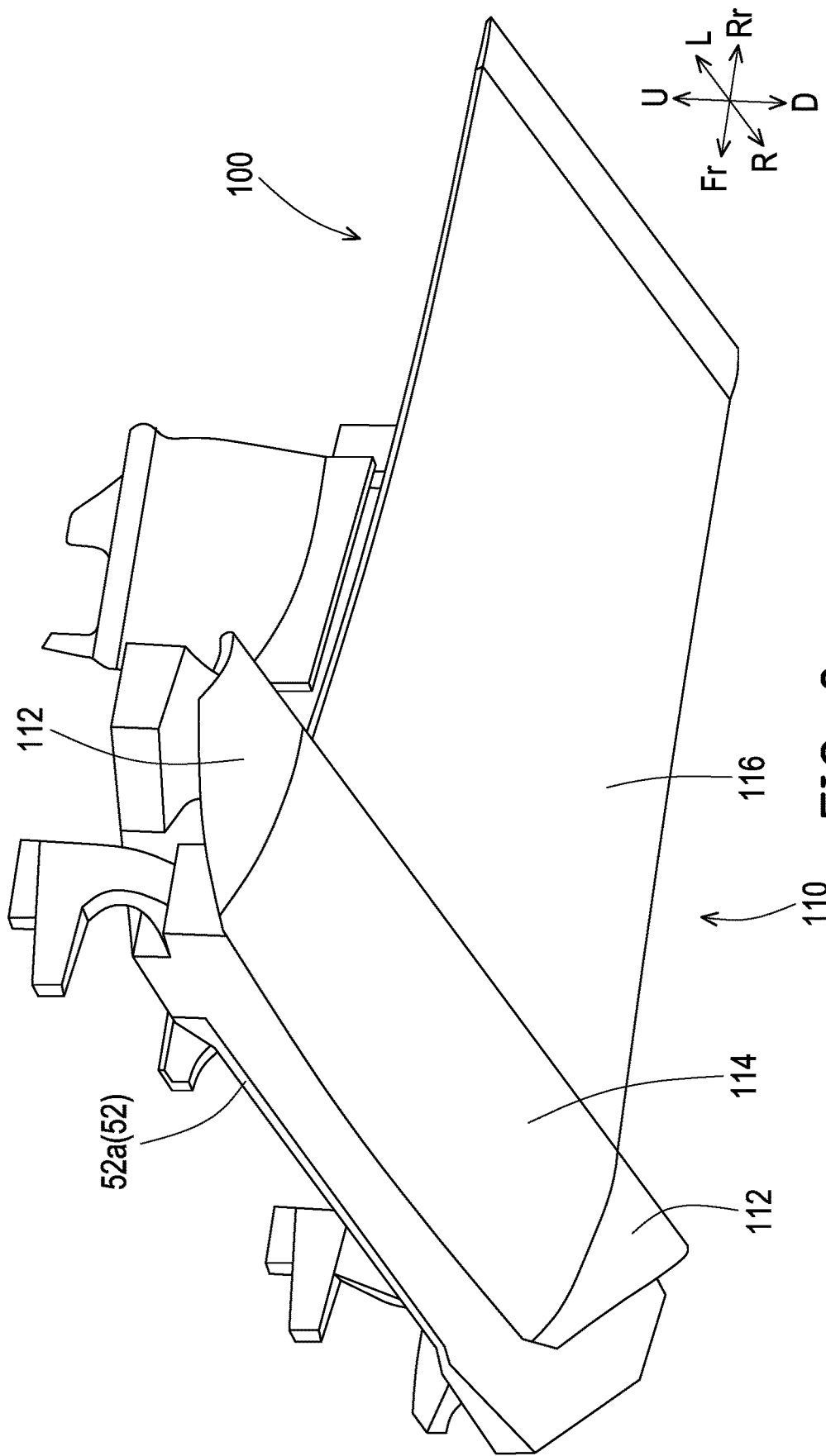
FIG. 2 is a schematic perspective view of the vehicle body lower structure shown in FIG. 1 when viewed from the front to the rear and from the bottom to the top.
Figure 3:
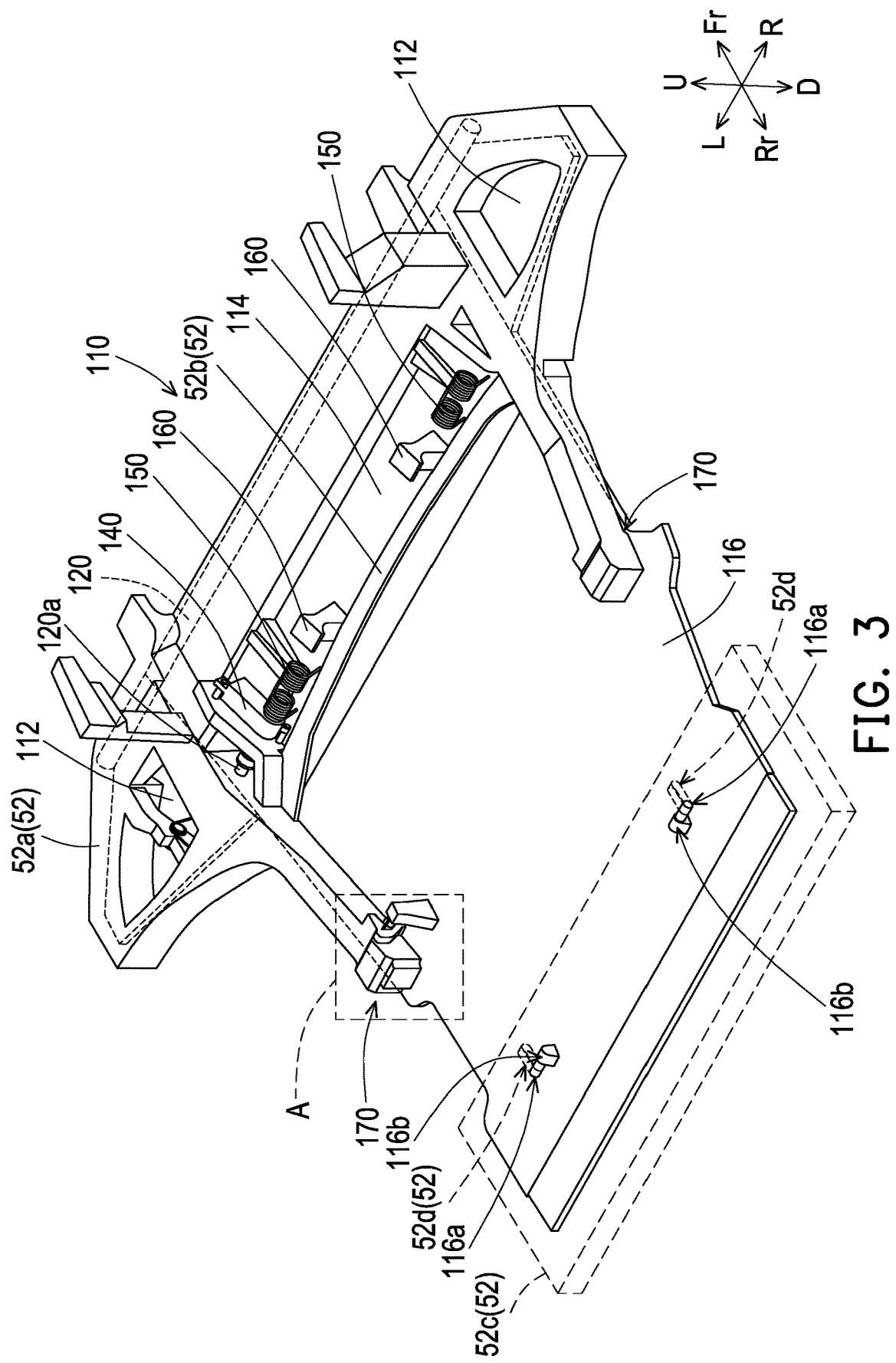
FIG. 3 is a schematic perspective view of the vehicle body lower structure shown in FIG. 2 when viewed from the rear to the front and from the top to the bottom.
Figure 4A:
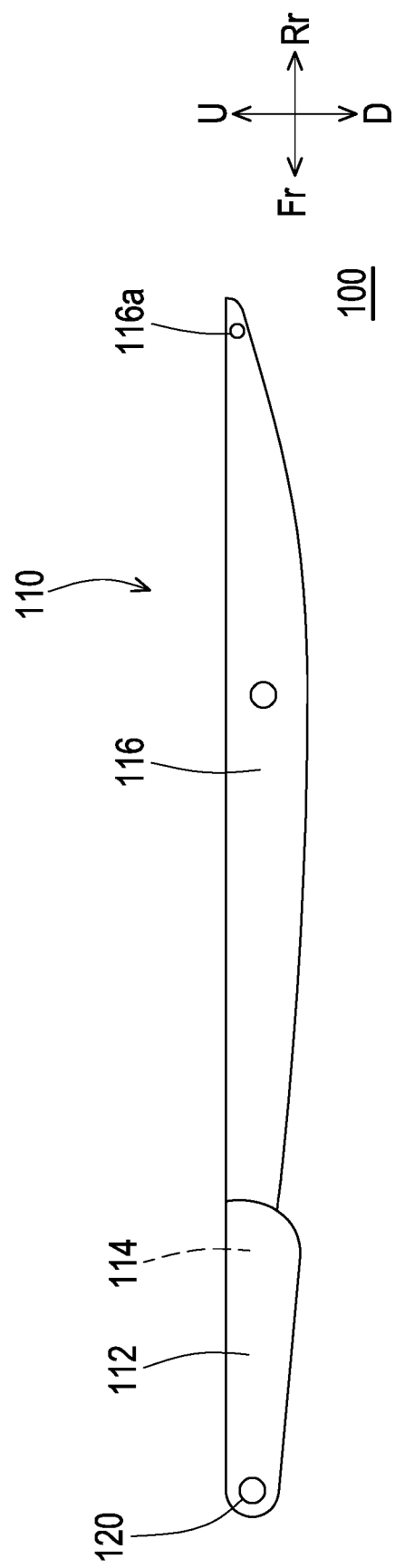
FIG. 4A and FIG. 4B are schematic side views of a deflector shown in FIG. 3 when it is in a stowed position and a deployed position.
Figure 4B:
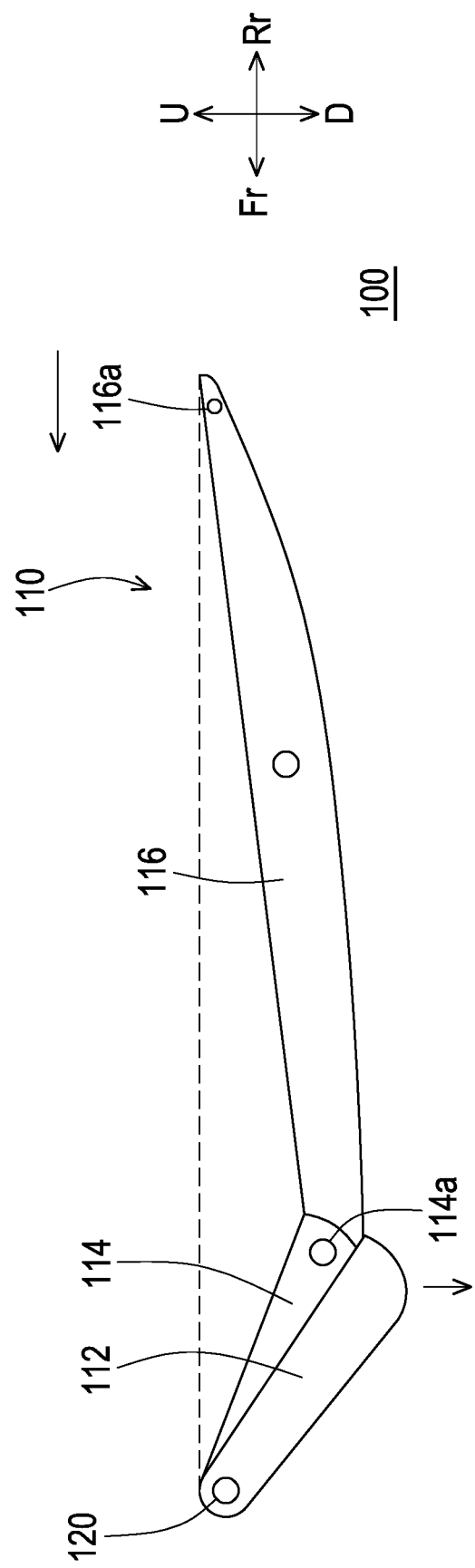
Figure 5:
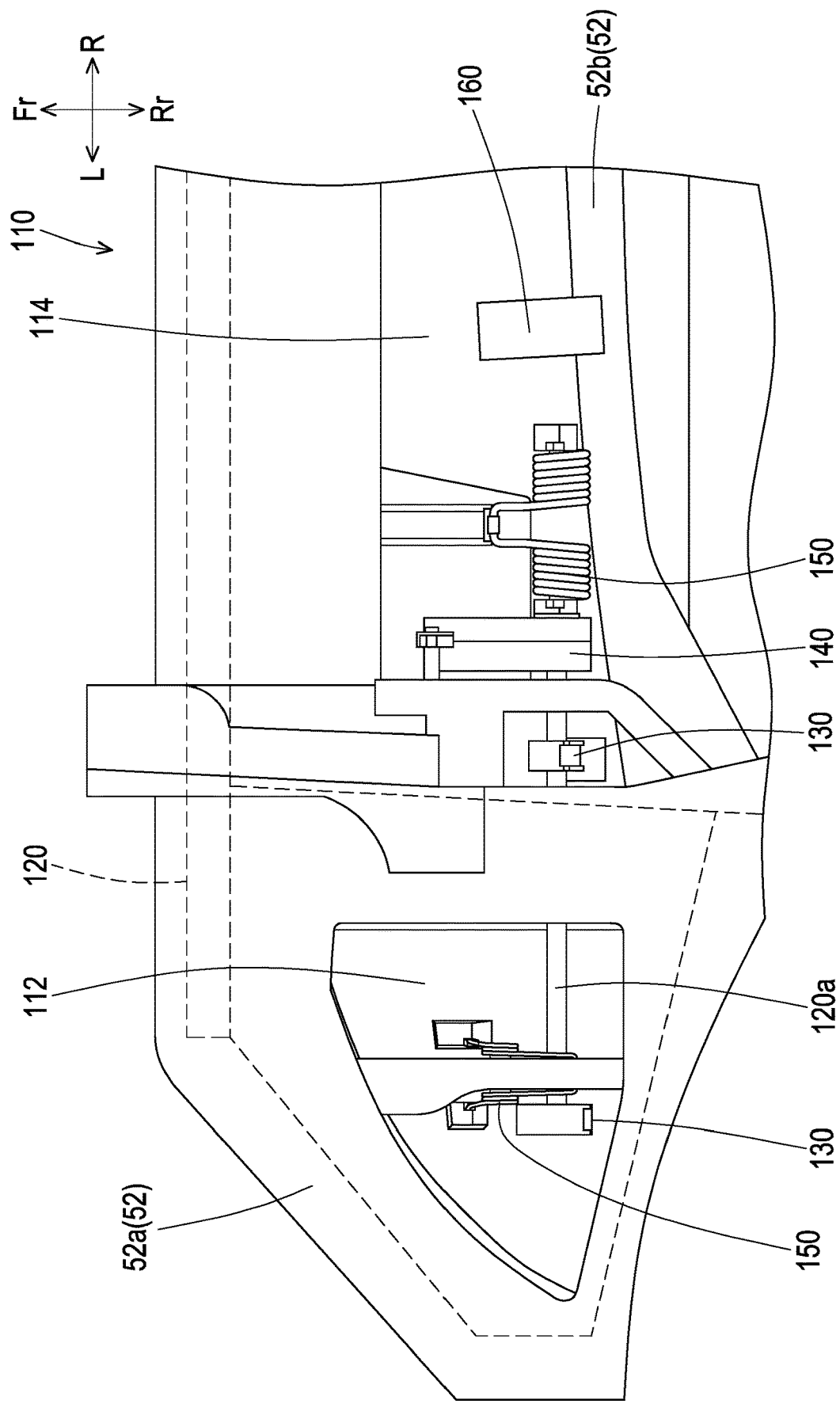
FIG. 5 is a schematic top view of the vehicle body lower structure shown in FIG. 3 on one side.
Figure 6D:
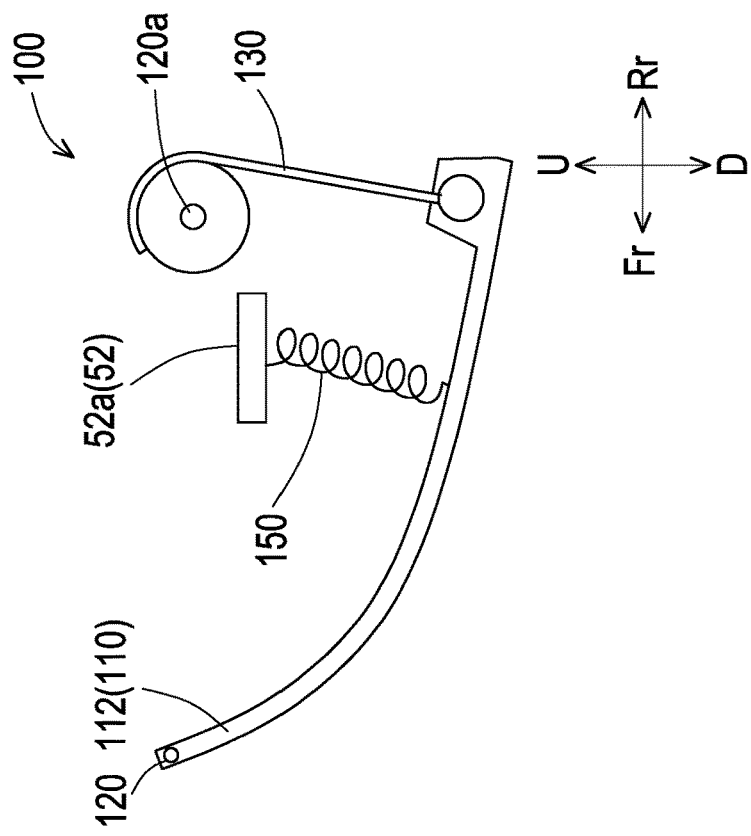
Figure 7A:
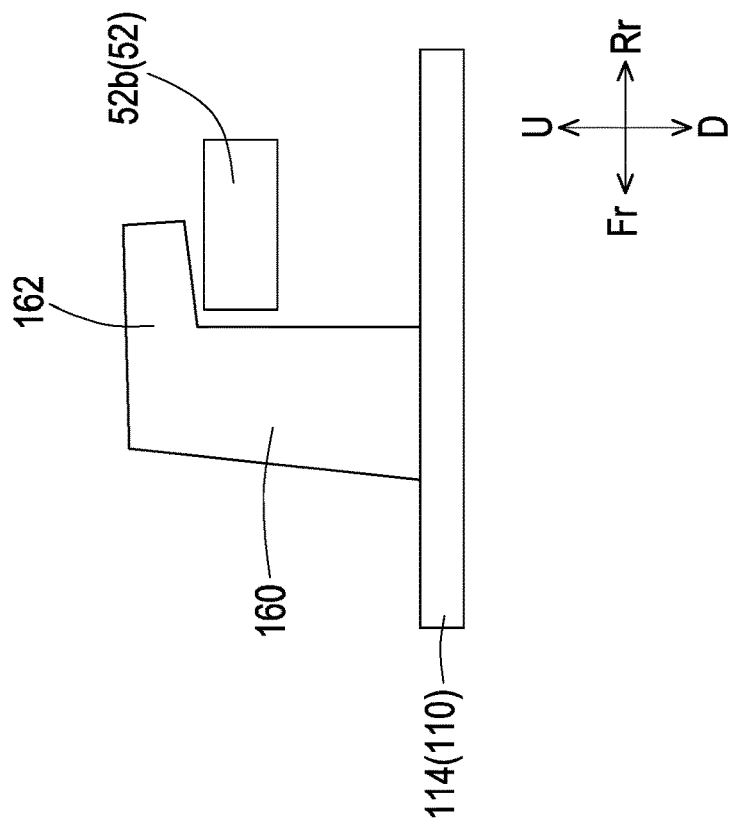
FIG. 7A and FIG. 7B are schematic side views of a hook member shown in FIG. 5 when the deflector is in the stowed position and the deployed position.
Figure 7B:
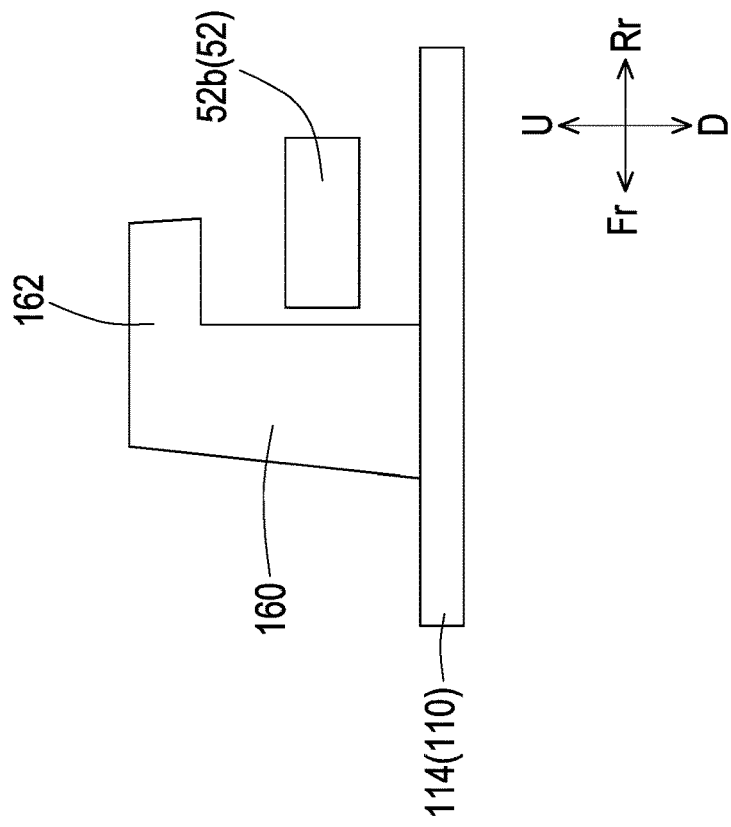
Figure 8:
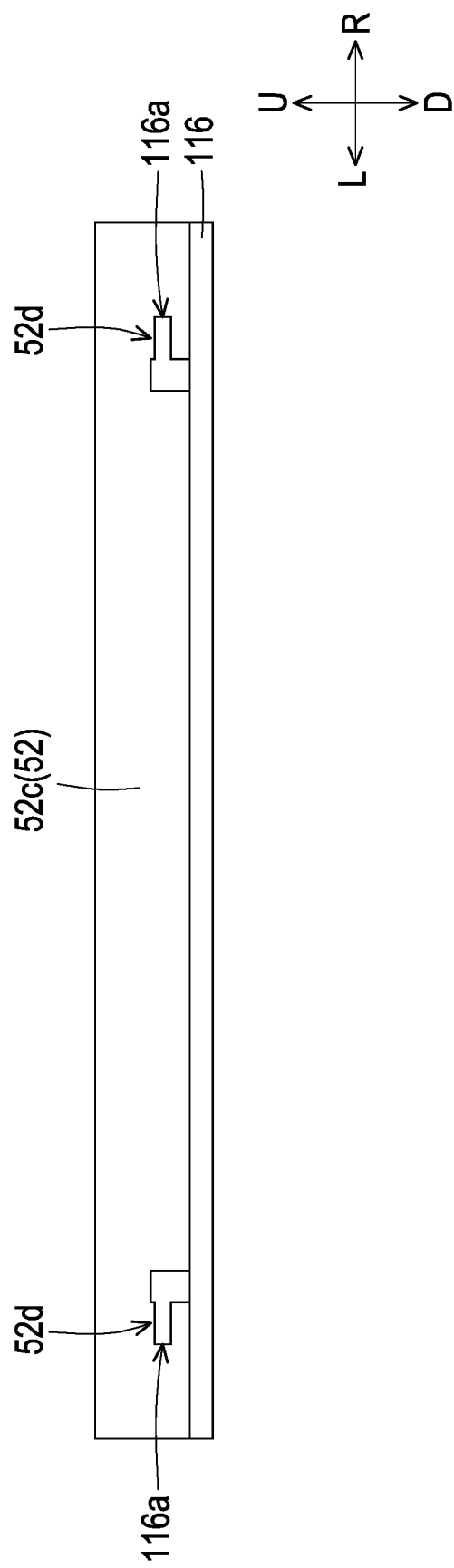
FIG. 8 is a schematic plan view of the vehicle body lower structure shown in FIG. 3 at a rear end of the deflector.
Figure 9:
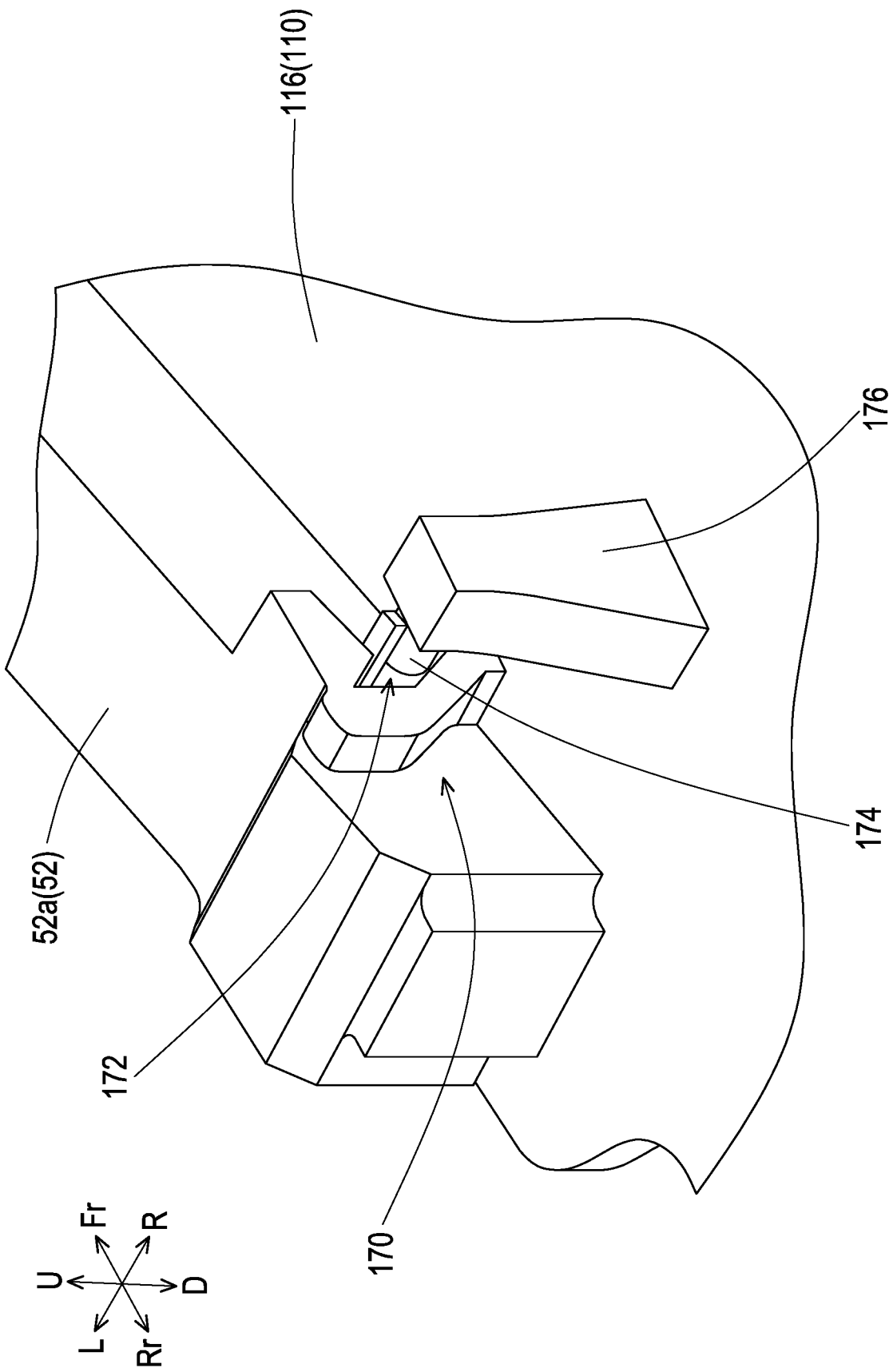
FIG. 9 is a partial enlarged schematic view of the vehicle body lower structure shown in FIG. 3 at a rear end of the deflector.
Figure 10:
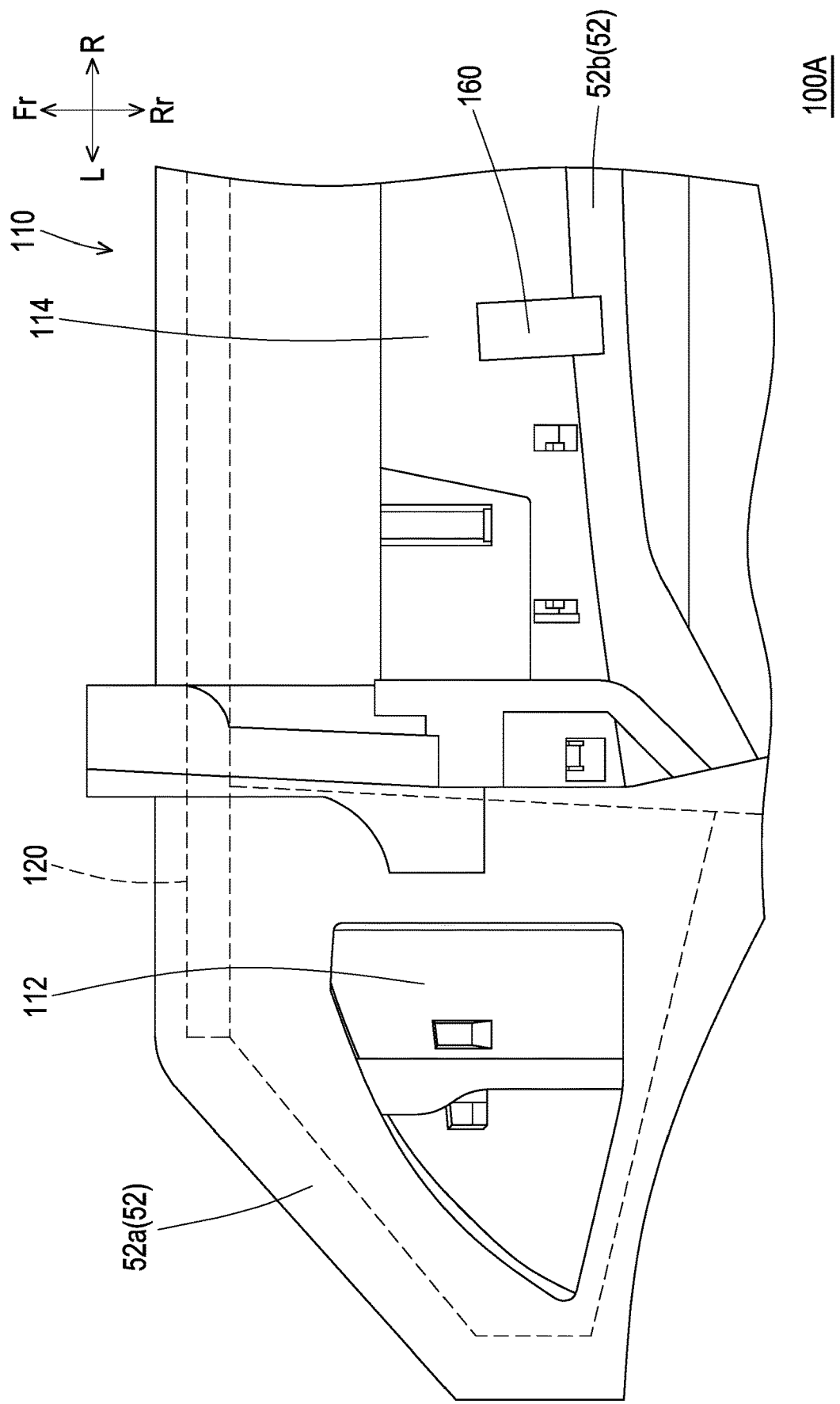
FIG. 10 is a schematic top view of a vehicle body lower structure on one side according to another embodiment of the disclosure.
Figure 12:
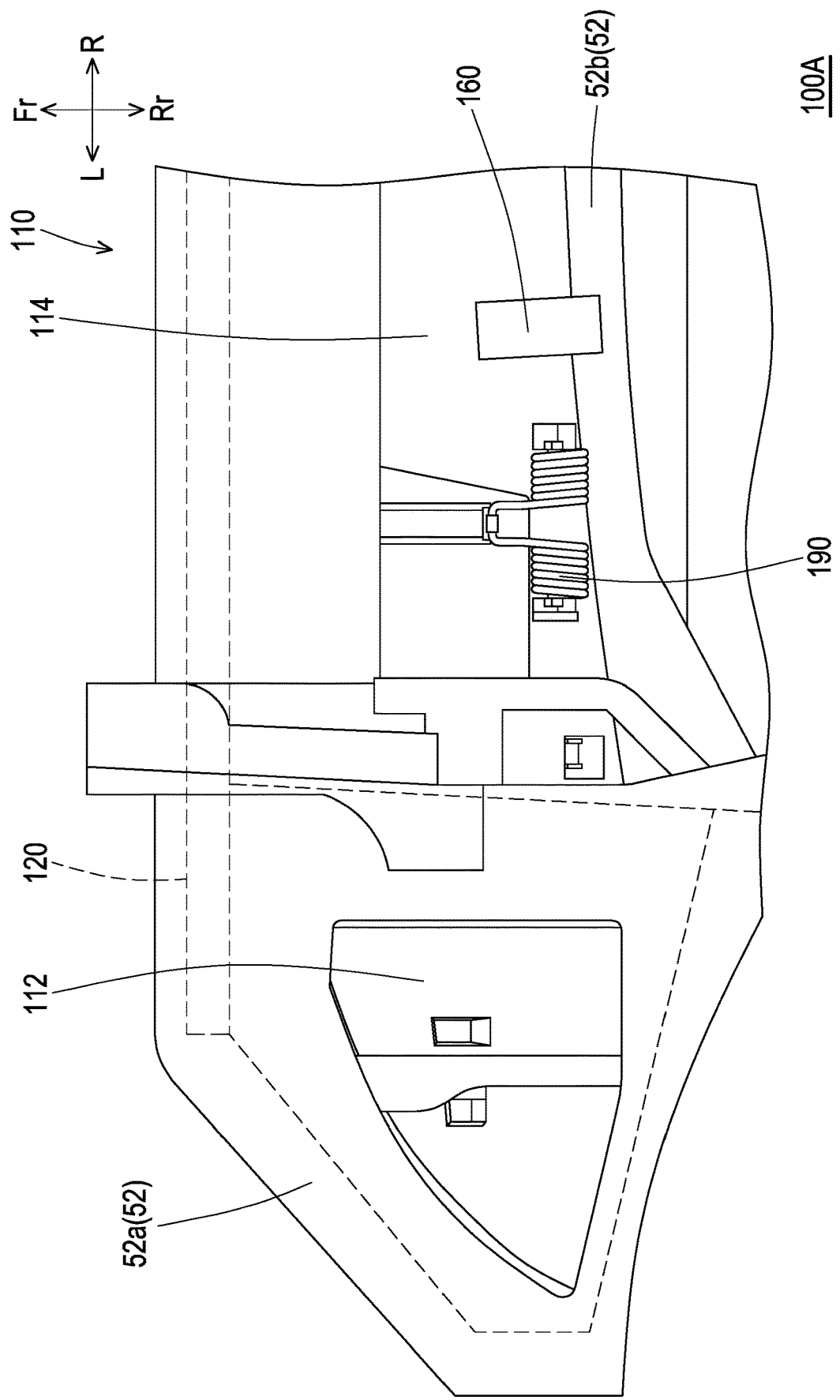
FIG. 12 is a schematic top view of a modification of the vehicle body lower structure shown in FIG. 10.
Figure 13B:
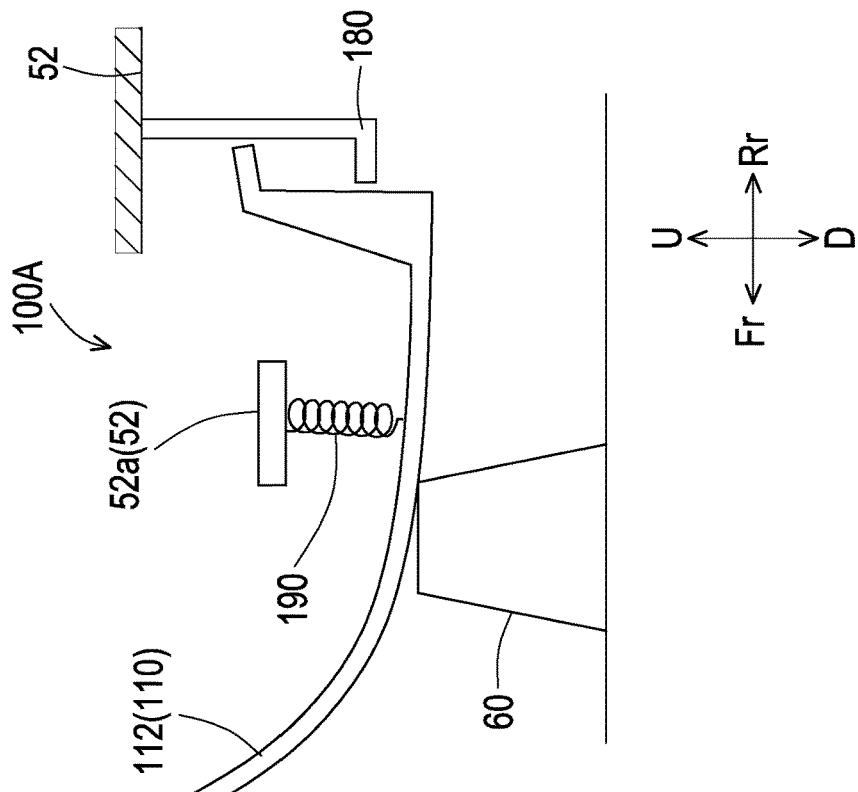
FIG. 13A and FIG. 13B are schematic side views of the deflector of the vehicle body lower structure shown in FIG. 12 at the stowed position and the deployed position.
Figure 13A:
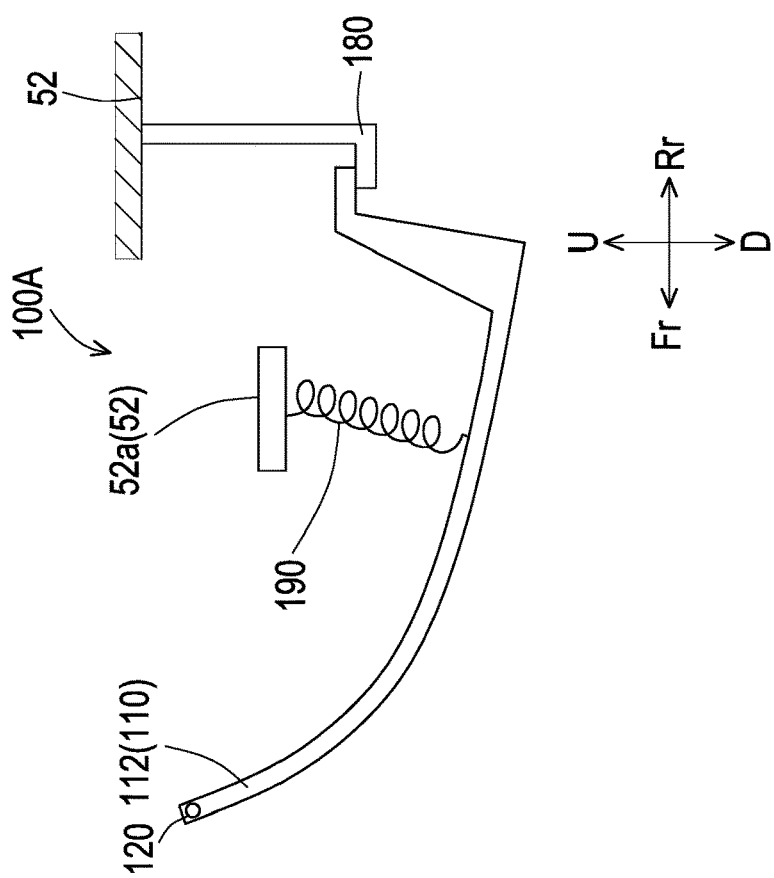

Reference will now be made in detail to the exemplary embodiments of the disclosure, examples of which are illustrated in the accompanying drawings. FIG. 1 is a schematic perspective view of a vehicle body lower structure applied to a vehicle body according to an embodiment of the disclosure. FIG. 2 is a schematic perspective view of the vehicle body lower structure shown in FIG. 1 when viewed from the front to the rear and from the bottom to the top. FIG. 3 is a schematic perspective view of the vehicle body lower structure shown in FIG. 2 when viewed from the rear to the front and from the top to the bottom. FIG. 4A and FIG. 4B are schematic side views of a deflector shown in FIG. 3 when it is in a stowed position and a deployed position. FIG. 5 is a schematic top view of the vehicle body lower structure shown in FIG. 3 on one side. FIG. 6A to FIG. 6D are schematic side views of a belt member shown in FIG. 5 when the deflector is in the stowed position, the deployed position, encounters an obstacle, and after passing an obstacle. FIG. 7A and FIG. 7B are schematic side views of a hook member shown in FIG. 5 when the deflector is in the stowed position and the deployed position. FIG. 8 is a schematic plan view of the vehicle body lower structure shown in FIG. 3 at a rear end of the deflector. FIG. 9 is a partial enlarged schematic view of the vehicle body lower structure shown in FIG. 3 at a rear end of the deflector. FIG. 10 is a schematic top view of a vehicle body lower structure on one side according to another embodiment of the disclosure. FIG. 11A and FIG. 11B are schematic side views of a deflector of the vehicle body lower structure shown in FIG. 10 at a stowed position and a deployed position. FIG. 12 is a schematic top view of a modification of the vehicle body lower structure shown in FIG. 10. FIG. 13A and FIG. 13B are schematic side views of the deflector of the vehicle body lower structure shown in FIG. 12 at the stowed position and the deployed position. The application and specific structure of a vehicle body lower structure 100 of this embodiment will be described below with reference to FIG. 1 to FIG. 9, and an anti-collision function of a deflector 110 used in a vehicle body lower structure 100A of another embodiment will be described with further reference to FIG. 10 to FIG. 13B. However, the vehicle body lower structures 100 and 100A are only examples of a part of the disclosure, and the disclosure is not limited thereto.

Referring to FIG. 1 to FIG. 3, in this embodiment, the vehicle body lower structure 100 is disposed at a lower part of a vehicle 50 (as shown in FIG. 1), for example, at a lower part in front of the vehicle 50, adjacent to a pair of left and right front wheels 54 disposed in front of a vehicle body 52 of the vehicle 50. The vehicle body lower structure 100 includes the deflector 110 disposed on the vehicle body 52 (as shown in FIG. 1) of the vehicle 50 and movable between a stowed position (as shown in FIG. 4A) covering the lower part of the vehicle body 52 and a deployed position (as shown in FIG. 4B) protruding downward. The deflector 110 is disposed on the vehicle body 52, for example, rotatably disposed on the vehicle body 52. The covering of the lower part of the vehicle body 52 refers to that the guide deflector 110 shields at least a part of the lower part of the vehicle body 52, but the deflector 110 is not limited to be parallel to a horizontal plane where the vehicle 50 is located or a flat surface formed by the vehicle body 52. When the deflector 110 is in the stowed position, it may also be inclined at an included angle. The deployed position refers to a position further downward than the stowed position. When the vehicle 50 is traveling, moving the deflector 110 from the stowed position (as shown in FIG. 4A) to the deployed position (as shown in FIG. 4B) can rectify the airflow flowing from the front to the rear (for example, from a vehicle front direction Fr to a vehicle rear direction Rr shown in FIG. 1), and effectively improve the aerodynamic performance.

Hereinafter, the specific structure of the vehicle body lower structure 100 will be described in four parts. In the first part of the disclosure, a front structure of the deflector 110 used in the vehicle body lower structure 100 is described. In the second part of the disclosure, an anti-collision structure of the deflector 110 used in the vehicle body lower structure 100 is described. In the third part of the disclosure, an over-deployment prevention structure of the deflector 110 used in the vehicle body lower structure 100 is described. In the fourth part of the disclosure, a rear structure of the deflector 110 configured for the vehicle body lower structure 100 will be described. Moreover, another embodiment of the related anti-collision function is further proposed for the anti-collision structure of the deflector 110 used in the vehicle body lower structure 100 described in the second part of the disclosure. However, the disclosure is not limited thereto, and may be adjusted according to requirements.

First, in the first part of the disclosure, the front structure of the deflector 110 used in the vehicle body lower structure 100 will be described. Referring to FIG. 1 to FIG. 3, in this embodiment, the deflector 110 includes first deflectors 112 and a second deflector 114. The first deflectors 112 are disposed in front of the pair of left and right front wheels 54 of the vehicle 50 (as shown in FIG. 1). For example, a pair of first deflectors 112 are provided in front of the pair of front wheels 54. Correspondingly, the second deflector 114 is disposed below a center of the vehicle body 52, for example, between the pair of first deflectors 112. The second deflector 114 may also be referred to as a front deflector. A rear deflector 116 is further provided in a rear structure of the deflector 110 (as will be described in the fourth part below), and the first deflectors 112 act as fairings on the left and right sides of the second deflector 114. Therefore, the front structure of the deflector 110 is divided into two parts (i.e. the first deflectors 112 and the second deflector 114), thus different settings may be made. For example, the first deflectors 112 and the second deflector 114 have different amount of protrusion when in the deployed position (as shown in FIG. 4B).

In detail, in this embodiment, as shown in FIG. 3, FIG. 4A, and FIG. 4B, the vehicle body lower structure 100 further includes a shaft member 120. The shaft member 120 extends in a vehicle left-right direction (for example, in a vehicle left direction L and a vehicle right direction R shown in FIG. 3), and rotatably connects the front ends of the deflector 110 (for example, the ends corresponding to the vehicle front direction Fr in FIG. 3) to the vehicle body 52. In other words, the first deflectors 112 and the second deflector 114 are each rotatably connected to the vehicle body 52 at their front ends via the shaft member 120 extending in the vehicle left-right direction; for example, each rotatably disposed on a front frame 52a of the vehicle body 52. Although the drawings show that the first deflectors 112 and the second deflector 114 are rotatably connected to the vehicle body 52 via the same shaft member 120, in other embodiments not shown, the first deflectors 112 and the second deflector 114 may also be disposed on the front frame 52a of the vehicle body 52 via different shaft members, and the different shaft members may extend along the same axis of rotation, or be parallel but staggered one behind another and forth and the like. Moreover, when the axis of rotation of the first deflectors 112 and the second deflector 114 are staggered one behind another, the first deflectors 112 may also be configured as a single plate located in front of and on the left and right sides of the second deflector 114 (i.e. surrounding three sides of the second deflector 114); the disclosure is not limited thereto.

Furthermore, in this embodiment, as shown in FIG. 1 and FIG. 2, a rear end of the first deflector 112 is connected to the vehicle body 52 through belt members (to be described in the second part of the disclosure) used in an anti-collision structure to be described later. Correspondingly, a rear end of the second deflector 114 is connected to the rear deflector 116 to be described later (to be described in the fourth part of the disclosure), and, when in the deployed position, may be further connected to the vehicle body 52 through a hook member (to be described in the third part of the disclosure) used in an over-deployment prevention structure to be described later. The specific structures of the anti-collision structure, the over-deployment prevention structure, and the rear deflector 116 will be described later in the second part to the fourth part.

Therefore, in this embodiment, when the deflector 110 is in the stowed position (as shown in FIG. 4A), the first deflector 112 and the second deflector 114 cover the lower part of the vehicle body 52, and in a side view direction, the first deflector 112 located on an outer side and the second deflector 114 located in a center at least partially overlap. Correspondingly, when the deflector 110 is in the deployed position (as shown in FIG. 4B), the first deflector 112 and the second deflector 114 respectively rotate relative to the vehicle body 52 with the shaft member 120 as the axis of rotation. Therefore, the rear end of the first deflector 112 and the rear end of the second deflector 114 respectively protrude downward (for example, in a vehicle down direction D shown in FIG. 4B). In this situation, since the front structure of the deflector 110 is divided into two parts (i.e. the first deflectors 112 and the second deflector 114), the deflector 110 is set such that the amount of protrusion of the first deflectors 112 and the second deflector 114 in the deployed position (as shown in FIG. 4B) are different. At this time, the amount of protrusion of the first deflectors 112 disposed in front of the pair of front wheels 54 in the deployed position is preferably larger than the amount of protrusion of the second deflector 114 in the deployed position. In other words, in a situation where the front ends of the first deflectors 112 and the front end of the second deflector 114 are located at a same level, the rear ends of the first deflectors 112 are located further downward (for example, in the vehicle down direction D shown in FIG. 4B) than the rear end of the second deflector 114.

Thus, in this embodiment, the deflector 110 used in the vehicle body lower structure 100 described in the first part of the disclosure is divided into the first deflectors 112 in front of the pair of left and right front wheels 54 and the second deflector 114 in the center, and the amount of protrusion of the first deflectors 112 and the second deflector 114 in the deployed position are different. Therefore, when the deflector 110 is in the deployed position, flow velocity of the airflow increases along a curvature of the deflector 110, thereby increasing the negative pressures near inner sides of the front wheels 54 and increasing the negative pressures for attracting the vehicle 50 to a road surface. Accordingly, the vehicle body lower structure 100 described in the first part of the disclosure can improve the aerodynamic performance and the traveling stability.

Next, the anti-collision structure of the deflector 110 used in the vehicle body lower structure 100 will be described in the second part of the disclosure. Referring to FIG. 3 and FIG. 5, in this embodiment, the vehicle body lower structure 100 further includes the shaft member 120, belt members 130, and an actuator 140. For details of the shaft member 120, please refer to the first part. The belt members 130 are connected between the deflector 110 and the vehicle body 52. The actuator 140 is configured to wind the belt member 130. Since the front structure of the deflector 110 is divided into two parts (i.e. the first deflectors 112 and the second deflector 114), the following description will be given by taking as an example that the anti-collision structure composed of belt members 130 and the actuator 140 is disposed on the first deflectors 112 and the second deflector 114 (for example, two belt members 130 shown in FIG. 5 are located on the first deflector 112 and the second deflector 114, respectively). However, in other embodiments not shown, the anti-collision structure composed of the belt member 130 and the actuator 140 may also be disposed on only one of the first deflector 112 and the second deflector 114. Alternatively, the front structure of the deflector 110 may be provided with only one single plate (i.e. not divided into the first deflectors 112 and the second deflector 114), and provided with only one set of the anti-collision structure. The disclosure is not limited thereto.

In detail, in this embodiment, the vehicle body lower structure 100 further includes a drive shaft 120a. The drive shaft 120a extends in the vehicle left-right direction (for example, in the vehicle left direction L and the vehicle right direction R shown in FIG. 3 and FIG. 5), and is rotatably disposed on the vehicle body 52. Preferably, the drive shaft 120a is disposed to be parallel to the shaft member 120 and staggered one behind another. In other words, the shaft member 120 is configured for the rotation of the deflector 110, and the drive shaft 120a is configured to drive the belt member 130 (as will be described later). The belt member 130 is connected to the deflector 110 at one end, and connected to the vehicle body 52 at the other end; for example, connected to the corresponding first deflector 112 or the second deflector 114 at one end, and connected to the drive shaft 120a disposed on the front frame 52a of the vehicle body 52 at the other end. The belt member 130 is, for example, an elastic belt, but not limited thereto. Preferably, the belt member 130 is connected to the drive shaft 120a in such a manner that it is wound around the drive shaft 120a, so as to be indirectly connected to the front frame 52a of the vehicle body 52. Furthermore, the actuator 140 is disposed on the drive shaft 120a to drive the drive shaft 120a to rotate, so as to wind the belt member 130 around the drive shaft 120a. However, the disclosure does not limit the method by which the actuator 140 winds the belt member 130. For example, in other embodiments not shown, the drive shaft 120a may be omitted, and the belt member 130 may be wound via the shaft member 120.

Furthermore, in this embodiment, as shown in FIG. 5, the vehicle body lower structure 100 further includes force applying members 150. The force applying member 150 is disposed on the deflector 110 and applies force downward on the deflector 110. The force applying member 150 is, for example, a spring, but not limited thereto. The force applying member 150 constitutes a part of the anti-collision structure, and the force applying member 150 is disposed near the belt member 130. Thus, force applying member 150 is preferably disposed on the first deflector 112 and the second deflector 114 like the belt member 130 (for example, FIG. 5 shows two force applying members 150 respectively located on upper surfaces of the first deflector 112 and the second deflector 114). However, in other embodiments not shown, the force applying member 150 may also be disposed on only one of the first deflector 112 and the second deflector 114. Alternatively, the front structure of the deflector 110 may be provided with only one single plate (i.e. not divided into the first deflectors 112 and the second deflector 114), and one or more force applying members 150 may be disposed thereon. Alternatively, the force applying member 150 may be omitted, and the disclosure is not limited thereto.

Therefore, in this embodiment, the anti-collision structure disposed on the first deflector 112 is taken as an example for description. When the deflector 110 (for example, the first deflector 112) is in the stowed position (as shown in FIG. 4A), the deflector 110 covers the lower part of the vehicle body 52, and the belt member 130 is wound around the drive shaft 120a (as shown in FIG. 6A). Correspondingly, when the deflector 110 (for example, the first deflector 112) is in the deployed position (as shown in FIG. 4B), the deflector 110 protrudes downward (for example, in the vehicle down direction D shown in FIG. 6B), and the drive shaft 120a is rotated (for example, clockwise in FIG. 6B) by the drive of the actuator 140, thereby releasing the belt member 130 wound around the drive shaft 120a downward, such that the belt member 130 extends downward along with the movement of the deflector 110 (as shown in FIG. 6B), and is capable of supporting the deflector 110 in the deployed position. In other words, when the deflector 110 is in the stowed position or the deployed position, the length of downward extension of the belt member 130 is adjusted according to the rotation of the drive shaft 120a, such that the belt member 130 supporting the deflector 110 is in a straightened state in the stowed position or the deployed position. At the same time, the force applying member 150 applies force downward on the deflector 110, such that the deflector 110 moves downward more smoothly after force is applied thereon.

Figure 6C:
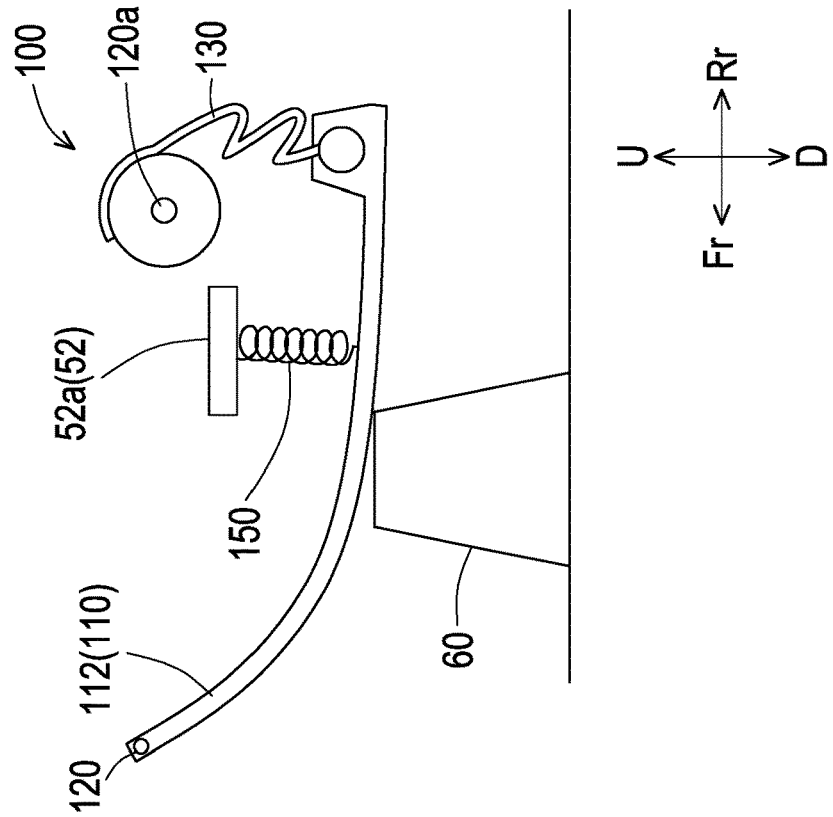

Furthermore, in this embodiment, when the deflector 110 is in the deployed position and encounters a collision of an obstacle 60 (as shown in FIG. 6C), the deflector 110 (for example, the first deflector 112) protruding downward is pushed upward by the obstacle 60 (for example, in a vehicle up direction U shown in FIG. 6C). At this time, since the belt member 130 has been sufficiently released and extended downward from the drive shaft 120a, the belt member 130 bends as the deflector 110 moves from the deployed position to the stowed position (as shown in FIG. 6C) without interfering with the movement of the deflector 110 to the stowed position. Moreover, since the force applying member 150 also has elasticity, it may also be compressed when the deflector 110 moves from the deployed position to the stowed position.

Moreover, in this embodiment, after the deflector 110 passes the obstacle 60 (as shown in FIG. 6D), the compressed force applying member 150 is released, thereby applying force downward on the deflector 110 (for example, the first deflector 112), such that the deflector 110 is moved downward (for example, in the vehicle down direction D shown in FIG. 6B) and reset, that is, moved to the deployed position. At this time, the deformed belt member 130 extends downward again along with the movement of the deflector 110, and further supports the deflector 110 in the deployed position. In other words, when the deflector 110 is in the deployed position and moved unintendedly due to encounters with the collision of the obstacle 60, the drive shaft 120a does not rotate nor change the length of the downward extension of the belt member 130, and the bending of the belt member 130 due to its own elasticity does not interfere with the movement of the deflector 110 to the stowed position. Therefore, the belt member 130 may not only serve as a support member to support the deflector 110, but also may, through deformation, prevent the deflector 110 from being damaged due to collision.

Thus, in this embodiment, the deflector 110 used in the vehicle body lower structure 100 described in the second part of the disclosure is provided with an anti-collision structure composed of the belt member 130, the actuator 140, and the like. When the deflector 110 is in the deployed position, the deflector 110 may be supported through the connection of the belt members 130, and when the deflector 110 encounters the obstacle 60, the belt member 130 bends without interfering with the movement of the deflector 110 to the stowed position, thereby avoiding damage to the deflector 110. Accordingly, the vehicle body lower structure 100 described in the second part of the disclosure can improve the aerodynamic performance, and can suppress the impact on the deflector 110 when the obstacle 60 is encountered.

Next, in the third part of the disclosure, the over-deployment prevention structure of the deflector 110 used in the vehicle body lower structure 100 will be described. Referring to FIG. 3 and FIG. 5, in this embodiment, the vehicle body lower structure 100 further includes hook members 160. The hook member 160 is disposed on an upper surface of the deflector 110, and is disposed near a snap portion 52b of the vehicle body 52. Therefore, depending on the state of the deflector 110 (i.e. in the stowed position or in the deployed position), the hook member 160 is separated from the snap portion 52b or snapped onto the snap portion 52b along with the movement of the deflector 110. Since the front structure of the deflector 110 is divided into two parts (i.e. the first deflectors 112 and the second deflector 114), the following description will be given by taking as an example that an over-deployment prevention structure composed of the hook members 160 and the snap portions 52b is disposed on the second deflector 114 (for example, the hook members 160 shown in FIG. 3 and FIG. 5 are disposed on the second deflector 114). However, in other embodiments not shown, the over-deployment prevention composed of the hook members 160 and the snap portions 52b may also be disposed only on the first deflectors 112, or may be disposed in multiple sets on the first deflectors 112 and the second deflector 114. Alternatively, the front structure of the deflector 110 may only be provided with a single plate (i.e. not divided into the first deflectors 112 and the second deflector 114), and one or more hook members 160 may be disposed thereon. The disclosure is not limited thereto.

In detail, in this embodiment, the snap portion 52b is, for example, a connection structure composed of a part of the front frame 52a of the vehicle body 52, and is, for example, a crossbar extending in the vehicle left-right direction (for example, in the vehicle left direction L and the vehicle right direction R shown in FIG. 3 and FIG. 5), but not limited thereto. Correspondingly, the hook member 160 is disposed on the upper surface of the deflector 110 (for example, the second deflector 114). Furthermore, the hook member 160 has a claw portion 162 protruding toward the rear of the vehicle (for example, in the vehicle rear direction Rr shown in FIG. 3 and FIG. 5). Moreover, the hook member 160 is located in front of the snap portion 52b (For example, in the vehicle front direction Fr shown in FIG. 3 and FIG. 5), and the claw portion 162 is located at a position higher than the snap portion 52b. Furthermore, the front ends of the deflector 110 are rotatably connected to the vehicle body 52 via the shaft member 120 extending in the vehicle left-right direction (for example, in the vehicle left direction L and the vehicle right direction R shown in FIG. 3 and FIG. 5). The hook member 160 is fixed to the snap portion 52b at a position further rearward than the shaft member 120 (for example, closer to the vehicle rear direction Rr shown in FIG. 5). In other words, the fixing portion (i.e. the claw portion 162) of the hook member 160 for fixing to the snap portion 52b is located more rearward than the shaft member 120, but the disclosure is not limited thereto.

As a result, in this embodiment, when the deflector 110 (for example, the second deflector 114) is in the stowed position (as shown in FIG. 4A), the hook member 160 is separated from the snap portion 52b of the vehicle body 52 (as shown in FIG. 7A); that is, the claw portion 162 of the hook member 160 is located above the snap portion 52b and is spaced apart by a certain distance. Correspondingly, when the deflector 110 (for example, the second deflector 114) is in the deployed position (as shown in FIG. 4B), the hook member 160 is snapped onto the snap portion 52b of the vehicle body 52 (as shown in FIG. 7B); that is, the claw portion 162 of the hook member 160 moves from above to below and abuts on an upper surface of the snap portion 52b, such that the claw portion 162 of the hook member 160 interferes with the snap portion 52b in an up-down direction of the vehicle. When the deflector 110 (for example, the second deflector 114) moves between the stowed position and the deployed position, the hook member 160 moves up and down along with the movement of the deflector 110. At this time, since the hook member 160 is located in front of the snap portion 52b, the up-and-down movement of the hook member 160 does not interfere with the snap portion 52b. Moreover, since the claw portion 162 of the hook member 160 protrudes rearward and is located above the snap portion 52b, the up-and-down movement of the hook member 160 causes the claw portion 162 to move away from or approach the snap portion 52b, whereby the hook member 160 is separated from the snap portion 52b or snapped onto the snap portion 52b.

Thus, in this embodiment, the deflector 110 used in the vehicle body lower structure 100 described in the third part of the disclosure is provided with an over-deployment prevention structure composed of the hook members 160, the claw portions 162, the snap portions 52b, and the like. When the deflector 110 is in the deployed position, the deflector 110 may be supported by being snapped onto the snap portion 52b of the vehicle body 52 by the hook member 160, thus the over-deployment or falling off of the deflector 110 can suppressed. When the deflector 110 is in the stowed position, the hook member 160 is separated from the snap portion 52b, thus the disposition of the hook member 160 does not affect the movement of the deflector 110 between the stowed position and the deployed position. Accordingly, the vehicle body lower structure 100 described in the third part of the disclosure can improve the aerodynamic performance, and can suppress over-deployment or falling off of the deflector 110.

Finally, in the fourth part of the disclosure, the rear structure of the deflector 110 used in the vehicle body lower structure 100 will be described. Referring to FIG. 1 to FIG. 3, in this embodiment, the deflector 110 includes the front deflector and the rear deflector 116. The front deflector is, for example, the second deflector 114 described in the first part of the disclosure, and the rear deflector 116 is connected behind the front deflector (the second deflector 114) (for example, in the vehicle rear direction Rr shown in FIG. 1 to FIG. 3). Therefore, the deflector 110 is divided into two parts (i.e. the front deflector and the rear deflector 116) in the vehicle front-rear direction (for example, in the vehicle front direction Fr and the vehicle rear direction Rr shown in FIG. 1 to FIG. 3), such that different settings may be made. For example, the front deflector (the second deflector 114) and the rear deflector 116 face different directions when in the deployed position (as shown in FIG. 4B).

In detail, in this embodiment, as shown in FIG. 3, FIG. 4A, and FIG. 4B, the vehicle body lower structure 100 further includes the shaft member 120. The front deflector (the second deflector 114) is rotatably disposed on the vehicle body 52 with its front end (for example, the end corresponding to the vehicle front direction Fr in FIG. 1 to FIG. 3); for example, the front end of the front deflector (the second deflector 114) is rotatably connected to the vehicle body 52 via the shaft member 120. Moreover, the rear end of the front deflector (the second deflector 114) (for example, the end corresponding to the vehicle rear direction Rr in FIG. 1 to FIG. 3) is connected to the rear deflector 116. Correspondingly, the rear deflector 116 is rotatably disposed on the rear end of the front deflector (the second deflector 114) with its front end, and is disposed on the vehicle body 52 with its rear end slidable in the vehicle front-rear direction (for example, in the vehicle front direction Fr and the vehicle rear direction Rr shown in FIG. 1 to FIG. 3) (as shown in FIG. 3). For example, the front end of the rear deflector 116 is rotatably disposed on the rear end of the front deflector (the second deflector 114) via a rotation shaft 114a, and the rear end of the rear deflector 116 is slidably disposed on a rear frame 52c of the vehicle body 52 via slide pins 116a. The rear end of the rear deflector 116 refers to the part opposite to the front end. The disclosure is not limited thereto, as long as the disposition point is located at the rear part of the front and rear parts of the rear deflector 116.

Furthermore, as shown in FIG. 3 and FIG. 8, in this embodiment, the rear frame 52c of the vehicle body 52 may be provided with a pair of left and right slide grooves 52d extending in the vehicle front-rear direction (for example, in the vehicle front direction Fr and the vehicle rear direction Rr shown in FIG. 1 to FIG. 3), and a pair of left and right slide pins 116a may be provided on an upper surface of the rear deflector 116. The slide pin 116a is, for example, a pin disposed on a base 116b protruding upward from the upper surface of the rear deflector 116. Furthermore, the slide groove 52d is disposed on an outer side of the slide pin 116a in the vehicle width direction (for example, in the vehicle left direction L and the vehicle right direction R shown in FIG. 3 and FIG. 8), and the slide pin 116a extends outward. Therefore, the slide pin 116a may be fitted in the slide groove 52d, and the slide pin 116a may slide in the slide groove 52d along with the movement of the rear deflector 116. However, in other embodiments not shown, the positions of the slide groove 52d and the slide pin 116a may also be exchanged. For example, the slide groove 52d is disposed on an inner side of the slide pin 116a, and the slide pin 116a extends inwardly. Alternatively, the slide groove 52d is disposed on the rear deflector 116 and the slide pin 116a is disposed on the vehicle body 52; or, other structures slidable through engagement may also be used as the sliding member. The disclosure is not limited thereto.

Furthermore, referring to FIG. 3 and FIG. 9. FIG. 9 is a partial enlarged view of a part of the rear structure of the vehicle body lower structure 100 shown in FIG. 3 (for example, the area covered by a region A of FIG. 3) to clearly illustrate a guide member 170 at the rear end of the rear deflector 116. In this embodiment, the vehicle body lower structure 100 further includes guide members 170. The guide member 170 is disposed between the vehicle body 52 and the rear deflector 116 to guide the movement of the deflector 110 to the deployed position. The guide member 170 includes a recess groove 172 disposed on the vehicle body 52 and a protruding column 174 disposed on the rear end of the rear deflector 116. The recess groove 172 is, for example, a C-shaped groove, and the protruding column 174 is, for example, a pin disposed on a base stand 176 protruding upward from the upper surface of the rear deflector 116. Furthermore, the recess groove 172 is disposed on an outer side of the protruding column 174 in the vehicle width direction (for example, in the vehicle left direction L and the vehicle right direction R shown in FIG. 3 and FIG. 9), and the protruding column 174 extends outward. Therefore, the protruding column 174 may be fitted into the recess groove 172, and the protruding column 174 may slide in the recess groove 172 along with the movement of the rear deflector 116. However, in other embodiments not shown, the positions of the recess groove 172 and the protruding column 174 may also be exchanged. For example, the recess groove 172 is disposed on an inner side of the protruding column 174 and the protruding column 174 extends inwardly. Alternatively, the recess groove 172 is disposed on the rear deflector 116 and the protruding column 174 is disposed on the vehicle body 52; or, other structures slidable through engagement may be used as the guide member. The disclosure is not limited thereto.

Therefore, in this embodiment, when the deflector 110 is in the stowed position (as shown in FIG. 4A), the front deflector (the second deflector 114) and the rear deflector 116 cover the lower part of the vehicle body 52. Correspondingly, when the deflector 110 is in the deployed position (as shown in FIG. 4B), the front deflector (the second deflector 114) rotates relative to the vehicle body 52 with the shaft member 120 as the axis of rotation, thus the rear end of the front deflector (the second deflector 114) moves downward. At this time, the front end of the rear deflector 116 is connected to the rear end of the front deflector (the second deflector 114), so the front end of the rear deflector 116 rotates relative to the vehicle body 52 with the rotation shaft 114a as the axis of rotation, such that the front end of the rear deflector 116 moves downward. Moreover, the rear end of the rear deflector 116 slides forward through the engagement of the slide pin 116a and the slide groove 52d, and the protruding column 174 of the guide member 170 moves along the recess groove 172 to guide the movement of the rear deflector 116.

In this situation, since the deflector 110 is divided into two parts (i.e. the front deflector and the rear deflector 116) in the vehicle front-rear direction (for example, in the vehicle front direction Fr and the vehicle rear direction Rr shown in FIG. 1 to FIG. 3), the deflector 110 is set such that the front deflector (the second deflector 114) and the rear deflector 116 face different directions when in the deployed position (as shown in FIG. 4B). In other words, the front end of the front deflector (the second deflector 114) rotates about the shaft member 120 as the axis of rotation, such that the rear end of the front deflector (the second deflector 114) moves downward. Correspondingly, the front end of the rear deflector 116 is driven by the rear end of the front deflector (the second deflector 114) to move downward. Therefore, the front end of the rear deflector 116 rotates relative to the vehicle body 52 with the rotation shaft 114a as the axis of rotation. Then, the rear end of the rear deflector 116 slides in the vehicle front-rear direction through the engagement of the slide pin 116a and the slide groove 52d and the guidance of the guide member 170. Therefore, when the front deflector (the second deflector 114) is in the deployed position, its upper surface faces the rear, and when the rear deflector 116 is in the deployed position, its upper surface faces the front. Therefore, the front deflector (the second deflector 114) and the rear deflector 116 face different directions when in the deployed position (as shown in FIG. 4B); for example, the deflector 110 forms a V-shape, but the disclosure is not limited thereto.

Thus, in this embodiment, the deflector 110 used in the vehicle body lower structure 100 described in the fourth part of the disclosure is divided into the front deflector (the second deflector 114) and the rear deflector 116. Therefore, when the deflector 110 is in the deployed position, the rear deflector 116 slides forward, such that the front deflector (the second deflector 114) and the rear deflector 116 face different directions when in the deployed position, such that the flow velocity of the airflow can be increased along the deflector 110. Accordingly, the vehicle body lower structure 100 described in the fourth part of the disclosure can rectify the airflow on the deflector 110 and can improve the aerodynamic performance.

Moreover, for the anti-collision structure of the deflector 110 used in the vehicle body lower structure 100 described in the second part of the disclosure, another embodiment of the related anti-collision function is proposed. Referring to FIG. 10, in this embodiment, the vehicle body lower structure 100A has a similar configuration to the vehicle body lower structure 100 shown in FIG. 5, so the vehicle body lower structure 100A may be applied to the vehicle 50 shown in FIG. 1, and has an appearance as shown in FIG. 1 and FIG. 2. The specific structure of the vehicle body lower structure 100A of this embodiment and the difference in the anti-collision structure between the vehicle body lower structure 100A of this embodiment and the vehicle body lower structure 100 described in the second part of the previous embodiment will be described in detail below.

In this embodiment, as shown in FIG. 10, FIG. 11A, and FIG. 11B, the vehicle body lower structure 100A includes the deflector 110 and the shaft member 120. The deflector 110 is disposed on the vehicle body 52 of the vehicle 50 (as shown in FIG. 1), and may move between a stowed position covering the lower part of the vehicle body 52 (as shown in FIG. 4A) and a deployed position protruding downward (as shown in FIG. 4B). The shaft member 120 extends in the vehicle left-right direction (for example, in the vehicle left direction L and the vehicle right direction R shown in FIG. 10), and rotatably connects the front end of the deflector 110 (for example, the end corresponding to the vehicle front direction Fr in FIG. 10) to the vehicle body 52. For the description of the deflector 110 and the shaft member 120, reference may be made to the description in the previous embodiment, and details are not repeated here.

Furthermore, in this embodiment, the anti-collision structure of vehicle body lower structure 100A of this embodiment is different from that of the vehicle body lower structure 100 described in the second part of the previous embodiment in that, the vehicle body lower structure 100 of the previous embodiment is provided with components such as the drive shaft 120a, the belt members 130, and the actuator 140 as the anti-collision structure (as shown in FIG. 3 and FIG. 5), but the vehicle body lower structure 100A of this embodiment is not disposed with these anti-collision structures, and the deflector 110 of the vehicle body lower structure 100A is maintained in the deployed position protruding downward by its own weight (as shown in FIG. 11A). Moreover, when an impact load is received from below, the deflector 110 moves from the deployed position to the stowed position (as shown in FIG. 11B).

To be specific, in this embodiment, the deflector 110 of the vehicle body lower structure 100A is maintained in the deployed position protruding downward by its own weight (as shown in FIG. 11A). The deflector 110 is maintained in the deployed position via a buckle member 180 disposed on the vehicle body 52. The buckle member 180 extends downward from the vehicle body 52 (in the vehicle down direction D in FIG. 11A), and forms a buckle structure from the back to the front, such that the rear end of the deflector 110 (for example, the front deflector 114) is buckled, and that the deflector 110 cannot move to a lower direction than the deployed position. However, there is no restriction on whether the deflector 110 moves upward (for example, the vehicle up direction U shown in FIG. 11A). Furthermore, in other embodiments not shown, the buckle member 180 may also be disposed on the vehicle body 52 to be bucked with the front end or the side of the deflector 110. The disclosure does not limit the specific embodiment of the buckle member 180 (not limited to the type shown in FIG. 11A), as long as the deflector 110 may be maintained in the deployed position.

Moreover, the vehicle body lower structure 100A of this embodiment may further use the hook member 160 described in the third part of the previous embodiment. In other words, as shown in FIG. 10, the vehicle body lower structure 100A further includes the hook member 160. The hook member 160 is disposed on the upper surface of the deflector 110, and is disposed near the snap portion 52b of the vehicle body 52. Therefore, when the deflector 110 is in the stowed position (as shown in FIG. 11B), the hook member 160 is separated from the snap portion 52b of the vehicle body 52 (as shown in FIG. 7A), and when the deflector 110 is in the deployed position (as shown in FIG. 11A), the hook member 160 is snapped onto the snap portion 52b of the vehicle body 52 (as shown in FIG. 7B). For the description of the hook member 160, reference may be made to the description in the third part of the previous embodiment, and details are not repeated here. The vehicle body lower structure 100A of this embodiment may optionally be disposed with the buckle member 180 shown in FIG. 11A and FIG. 11B and the hook member 160 shown in FIG. 7A, FIG. 7B, and FIG. 10 according to requirements, or both. Other components other than the buckle member 180 and the hook member 160 may also be used; the disclosure is not limited thereto.

Thus, in the vehicle body lower structure 100 described in the second part of the previous embodiment, the deflector 110 is normally located in the stowed position (as shown in FIG. 4A and FIG. 6A), and when in need of use (such as when the vehicle 50 is traveling), the drive shaft 120a is driven by the actuator 140 to rotate so as to release the belt member 130 downward, such that the deflector 110 is moved to the deployed position (as shown in FIG. 4B and FIG. 6B) and maintained there. When the deflector 110 is in the deployed position and encounters a collision by the obstacle 60 (as shown in FIG. 6C), the deflector 110 protruding downward is pushed by the obstacle 60 and moves upward (for example, in the vehicle up direction U shown in FIG. 6C), and the belt member 130 having elasticity will not interfere with the movement of the deflector 110 to the stowed position, thereby the anti-collision function is realized, and the damage of the deflector 110 due to the collision is avoided.

On the other hand, in the vehicle body lower structure 100A of this embodiment, the deflector 110 is normally located in the deployed position by its own weight (as shown in FIG. 11A), and is also in the deployed position when in need of use (such as when the vehicle 50 is traveling). In other words, the deflector 110 of the vehicle body lower structure 100A is located in the deployed position and not retracted in most cases. When the deflector 110 is in the deployed position and encounters a collision by the obstacle 60 (as shown in FIG. 11B), the deflector 110 protruding downward is pushed up by the obstacle 60 and moves upward (for example, in the vehicle up direction U shown in FIG. 11B). At this time, there are no other members above the deflector 110, therefore the movement of the deflector 110 to the stowed position is not interfered. After the deflector 110 passes the obstacle 60, the deflector 110 moves downward again by its own weight, and then maintained in the deployed position protruding downward (as shown in FIG. 11A). Thus, even if the vehicle body lower structure 100A of this embodiment is not disposed with the anti-collision structure (the drive shaft 120a, the belt member 130, the actuator 140, and the like) like the vehicle body lower structure 100 described in the second part of the previous embodiment, an anti-collision function can also be realized to prevent the deflector 110 from being damaged due to collision.

Moreover, referring to FIG. 12, in this embodiment, as a modification of the vehicle body lower structure 100A, the vehicle body lower structure 100A further includes an elastic member 190. The elastic member 190 is disposed between the vehicle body 52 and the deflector 110 to apply force on the deflector 110. The deflector 110 is maintained in the deployed position protruding downward further by the force applied by the elastic member 190 (as shown in FIG. 13A). Moreover, when an impact load is received from below, the elastic member 190 is compressed, allowing the deflector 110 to move from the deployed position to the stowed position (as shown in FIG. 13B).

Therefore, in this modification, the deflector 110 is normally located in the deployed position (as shown in FIG. 13A) by its own weight and the force applied by the elastic member 190, and is also in the deployed position when in need of use (such as when the vehicle 50 is traveling). In other words, the deflector 110 of the vehicle body lower structure 100A is located in the deployed position and is not retracted in most cases. At this time, compared with the case where the deflector 110 is maintained in the deployed position only by its own weight, the deflector 110 forced by the elastic member 190 may be maintained in the deployed position more stably (for example, the deflector 110 may be suppressed from shaking upward when the vehicle 50 is traveling). In this modification, the buckle member 180 or other types of buckle members may also be provided, or the hook member 160 may be provided to maintain the deflector 110 in the deployed position or prevent the deflector 110 from over-deployment. The layout and operation of the three are not related to each other, and whether to dispose them or not may be selected according to needs.

Furthermore, in this modification, when the deflector 110 is in the deployed position and encounters a collision by the obstacle 60 (as shown in FIG. 13B), the deflector 110 protruding downward is pushed upward by the obstacle 60 (for example, in the vehicle up direction U shown in FIG. 13B). At this time, only the elastic member 190 is provided above the deflector 110, and the elastic member 190 is compressed when the deflector 110 moves from the deployed position to the stowed position (as shown in FIG. 13B), so the movement of the deflector 110 to the stowed position is not interfered. After the deflector 110 passes the obstacle 60, the deflector 110 moves downward again by its own weight and the force applied by the elastic member 190, and then is maintained in the deployed position protruding downward (as shown in FIG. 13A). Therefore, even if this modification is not disposed with the anti-collision structure (the drive shaft 120a, the belt members 130, the actuator 140, and the like) of the vehicle body lower structure 100 as described in the second part of the previous embodiment, the anti-collision function can also be realized to prevent the deflector 110 from being damaged due to collision.

Thus, the vehicle body lower structure 100 described in the second part of the previous embodiment is provided with an anti-collision structure composed of the belt members 130, the actuator 140, and the like, but the vehicle body lower structure 100A described in this embodiment may be maintained in the deployed position by its own weight or further by the force applied by the elastic member 190. Therefore, in most cases, the deflector 110 is located in the deployed position and is not retracted, therefore components (the drive shaft 120a, the belt members 130, the actuator 140, and the like) required for adjusting the position of the deflector 110 may be omitted, and damage can be prevented in a situation where load is applied to components such as the actuator 140 at the time of collision. Furthermore, the deflector 110 maintained in the deployed position by its own weight or further by the force applied by the elastic member 190 may move to the stowed position without being interfered when encountering the obstacle 60, such that the damage to the deflector 110 can be avoided, and the anti-collision function can still be achieved. Accordingly, the vehicle body lower structure 100A according to another embodiment of the disclosure can improve the aerodynamic performance, and can suppress the impact on the deflector 110 when the obstacle 60 is encountered.

As described above, in the vehicle body lower structure of the disclosure, the deflector is disposed on the vehicle body, and may move between the stowed position covering the lower part of the vehicle body and the deployed position protruding downward, so as to improve aerodynamic performance. In the vehicle body lower structure described in the first part of the disclosure, the deflector is divided into first deflectors in front of a pair of left and right front wheels and a second deflector in the center. Therefore, the amount of protrusion of the first deflectors and the second deflector in the deployed position may be set to be different, such that the traveling stability can be improved. Moreover, in the vehicle body lower structure described in the second part of the disclosure, when the deflector is in the deployed position, the deflector may be supported through the connection of the belt members, and when the deflector encounters an obstacle, the belt members bend without interfering with the movement of the deflector to the stowed position, thereby suppressing the impact received by the deflector when an obstacle is encountered. Furthermore, in the vehicle body lower structure described in the third part of the disclosure, when the deflector is in the deployed position, the deflector may be supported by being snapped onto the snap portion of the vehicle body by the hook member, thereby suppressing the deflector from over-deployment or falling off. Moreover, in the vehicle body lower structure described in the fourth part of the disclosure, the deflector is divided into the front deflector and the rear deflector. When the deflector is in the deployed position, the rear deflector slides forward, such that the front deflector and the rear deflector face different directions. As a result, the flow velocity of the air flow on the deflector can be increased and the aerodynamic performance can be improved. In addition, in another embodiment of the disclosure, the deflector is maintained in the deployed position protruding downward by its own weight in most cases, and an impact load from below is received, the movement of the deflector to the stowed position will not be interfered, such that the impact which the deflector receives when encountering an obstacle can be suppressed. The vehicle body lower structure of the disclosure may be provided with the structures of the first part to the fourth part at the same time, or the structure as described in another embodiment/modification, or only at least one of them may be disposed according to the requirements. The disclosure is not limited thereto, and adjustments can be made according to requirements.

Finally, it should be noted that the above embodiments are used to only illustrate the technical solutions of the disclosure, but not to limit them. Although the disclosure has been described in detail with reference to the foregoing embodiments, it should be understood by those of ordinary skill in the art that it is still possible to modify the technical solutions described in the foregoing embodiments, or make equivalent substitutions for some or all of the technical features thereof; and, these modifications or substitutions do not make the essence of the corresponding technical solutions deviate from the scope of the technical solutions of the embodiments of the disclosure.

What is claimed is:
1. A vehicle body lower structure, comprising:
a deflector, disposed on a vehicle body of a vehicle and movable between a stowed position covering a lower part of the vehicle body and a deployed position protruding downward;
a shaft member, extending in a vehicle left-right direction and rotatably connecting a front end of the deflector to the vehicle body; and
an elastic member, disposed between the vehicle body and the deflector to apply force on the deflector,
wherein the deflector is maintained in the deployed position protruding downward by its own weight and further by the force applied by the elastic member, and when receiving an impact load from below, the elastic member is compressed, allowing the deflector to move from the deployed position to the stowed position.
2. The vehicle body lower structure according to claim 1, wherein the deflector is maintained in the deployed position via a buckle member disposed on the vehicle body.
3. The vehicle body lower structure according to claim 1, further comprising:
a hook member, disposed on an upper surface of the deflector,
wherein when the deflector is in the stowed position, the hook member is separated from a snap portion of the vehicle body, and when the deflector is in the deployed position, the hook member is snapped onto the snap portion of the vehicle body.

* * * * *